Nov. 5, 1957  C. S. GRIMSHAW  2,811,841
REFRIGERATOR APPARATUS
Filed Nov. 13, 1953  2 Sheets-Sheet 1

INVENTOR.
CHARLES S. GRIMSHAW
BY
HIS ATTORNEY

Nov. 5, 1957

C. S. GRIMSHAW 2,811,841

REFRIGERATOR APPARATUS

Filed Nov. 13, 1953

INVENTOR.
CHARLES S. GRIMSHAW
BY
HIS ATTORNEY

United States Patent Office 2,811,841
Patented Nov. 5, 1957

2,811,841
REFRIGERATOR APPARATUS

Charles S. Grimshaw, Erie, Pa., assignor to General Electric Company, a corporation of New York Application November 13, 1953, Serial No. 391,966

16 Claims. (Cl. 62—117.5)

My invention relates to refrigeration apparatus and pertains more particularly to refrigeration apparatus including new and improved means for increasing the operating efficiency thereof.

The operating efficiency of refrigeration apparatus is often increased by increasing the operating capacities of the heat exchange elements thereof, i. e., evaporators for cooling and condensers for dissipating heat resulting from operation of the apparatus. The operating capacities of the heat exchange elements are often increased by moving air relative to these elements. That is, often means such as fans are employed for increasing the cooling effect of an evaporator on a compartment by circulating air in the compartment over the evaporator or for increasing heat dissipation from a condenser by blowing air thereover. My invention contemplates increasing the operating capacities of the heat exchange elements of refrigeration apparatus and thereby increasing the operating efficiency of the apparatus by moving the heat exchange elements relative to the surrounding air.

The primary object of my invention is to provide new and improved means for increasing the operating efficiency of refrigeration apparatus.

Another object of my invention is to provide new and improved means for increasing the operating capacities of heat exchange elements in refrigeration apparatus.

Another object of my invention is to provide in refrigeration apparatus including heat exchange elements new and improved means for providing relative movement between the heat exchange elements and surrounding air.

Another object of my invention is to provide in refrigeration apparatus including heat exchange elements means for rotating the heat exchange elements.

Another object of my invention is to provide in refrigerating apparatus including a compressor and a heat exchange element new and improved means whereby a single drive motor is employed for operating the compressor and rotating the heat exchange element.

Another object of my invention is to provide in a refrigerating system including a compressor and a heat exchange element adapted for being driven and rotated, respectively, by a single motor means for varying the rotation of the heat exchange element in accordance with changes in the refrigeration load placed on the compressor to vary the operating capacity of the heat exchange element and thereby compensate for changes in the load.

Another object of my invention is to provide in a refrigerating system including a heat exchange element, a compressor and a motor for driving the compressor means for utilizing reaction to the driving of the compressor to rotate the heating element and determine the operating capacity thereof.

Still another object of my invention is to provide in a refrigerating system including a rotatable heat exchange element means including a single small low cost motor for rotating the heat exchange element at low speed to minimize noise and for driving a compressor at high speed so as to reduce size and therefore cost and weight.

Further objects and advantages of my invention will become apparent as the following description proceeds and the features of novelty which characterize my invention will be pointed out with particularity in the claims annexed to and forming part of this specification.

In carrying out the objects of my invention I provide a refrigerating system including a rotatable heat exchange element, a compressor, a motor for driving the compressor and means whereby the heat exchange element is rotated by reaction to the driving of the compressor by the motor. The reaction to the driving of the compressor is dependent on the compressor load as is the rotation of the heat exchange element whereby the capacity of the heat exchange element is varied in accordance with the refrigerant load.

For a better understanding of my invention reference may be had to the accompanying drawing in which.

Figure 1:
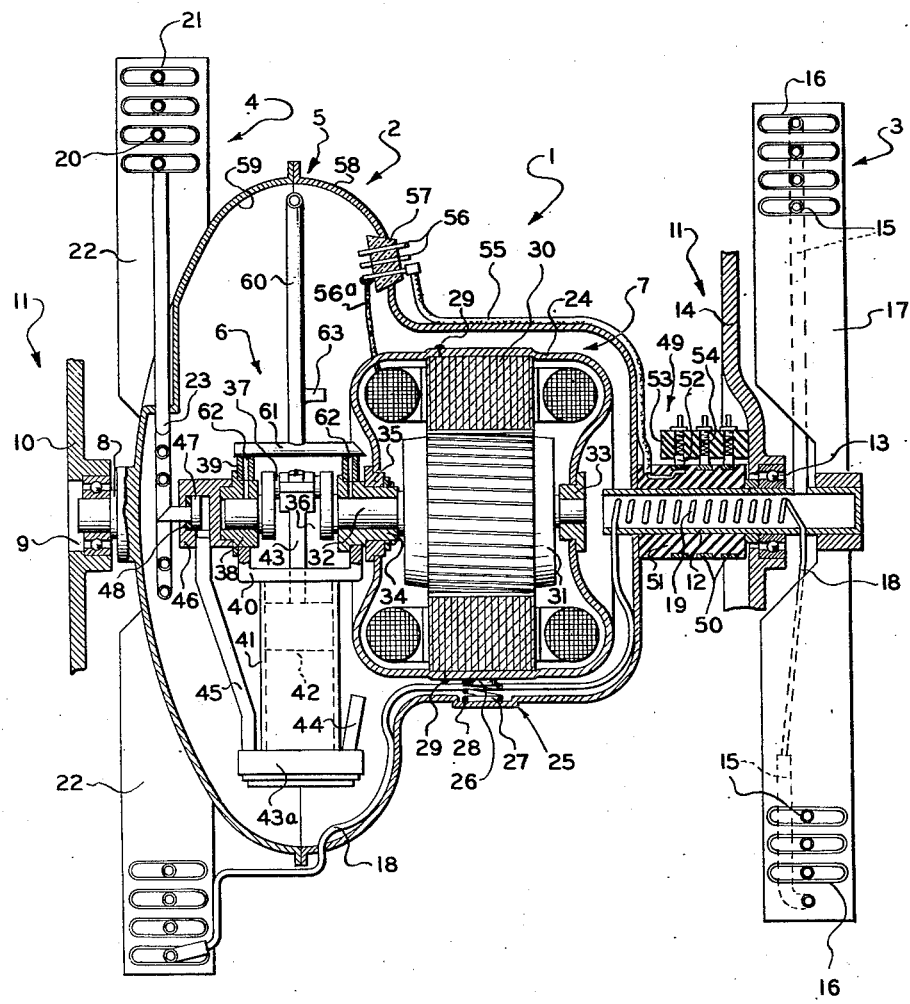
Fig. 1 is a detailed sectional view of a preferred embodiment of my invention.

Referring to the drawing, I have shown in Fig. 1 a refrigerating system generally designated 1 and comprising a refrigerating unit 2, a first heat exchange element or evaporator 3 and a second heat exchange element or condenser 4.

The refrigerating unit 2 comprises a case 5 housing a compressor generally designated 6 and a drive motor 7. Secured to the condenser side of the case 5 is a gudgeon 8 which is suitably journaled in a low friction bearing, such as a ball bearing, indicated by 9 and suitably fitted in a first portion 10 of a stationary frame 11 which is only partially shown. Fitted in the opposite or evaporator side of the case and axially aligned with the gudgeon 8 is a hollow extension or cylinder 12. The inner end of the cylinder 12 is open to provide communication with the low pressure case while its outer end is closed. The cylinder 12 is suitably journaled inwardly of its outer end in a second ball bearing 13 suitably fitted in a second portion 14 of the stationary frame 11. Thus, the case 5 is rotatably mounted in the frame 11.

The above mentioned first heat exchange element or evaporator 3 comprises a spirally wound tube 15 carrying a plurality of looped wire elements 16 for increasing the heat exchange surface thereof. The evaporator 3 is suitably fitted in a plurality of spokes or radially extending blades 17 secured, as by welding, to the outer end of the cylinder 12. In order to minimize heat conduction from the case 5 to the blades 17 and thence to the evaporator tubing 15 the hollow extensinon or cylinder 12 is preferably formed to have thin walls and of a high resistance material such as stainless steel. Connected to the cylinder 12 is the exhaust end or suction line of the evaporator tubing 15. Thus, communication is provided between the evaporator 3 and the case 5 for the conduction of vaporous refrigerant to the case from the evaporator. Connected to the inlet end of the evaporator tubing 15 for supplying liquid refrigerant to the evaporator is a capillary tube 18. The capillary tube 18 extends into the cylinder 12 and a helically wound intermediate portion 19 thereof extends through the cylinder 12. This arrangement provides for satisfactory heat exchange between the liquid refrigerant being supplied to the evaporator and the vaporous refrigerant passing through the cylinder 12 from the evaporator to the case.

From the cylinder 12, the capillary tube extends through the case 5 and exits at a side portion of the case. Outside the case, the capillary tube 18 connects with the outlet of the second heat exchange element or condenser 4. The condenser 4 is similar in construction to the evaporator 3 and comprises a spirally wound tube 20. The tube 20 also carries a plurality of looped wire elements 21 for increasing the heat exchange surface thereof and is also suitably fitted in a plurality of spokes or radially extending blades 22 secured to the end of the case 5 adjacent the first portion 10 of the frame 11.

The tube 20 includes an inlet portion 23 which extends into the case 5 and, in a manner which shall be described in detail hereafter, is adapted for being connected to the compressor 6 for having refrigerant under pressure supplied thereto for condensation.

In the case 5, the compressor 6 and the motor 7 are supported by a frame 24. The frame 24 is spider-like in construction and is supported in the case by a plurality of resilient mounts 25, only one of which is shown. The mounts 25 each comprise a stud 26 secured to the frame and a coil spring 27 fitted on the stud and disposed in a suitable spring seat 28 formed in the case. The mounts 25 are effective for maintaining the frame resiliently spaced from the walls of the case and in causing the frame to be connected to the case for being rotatable therewith.

Secured in the frame 24 as by welds 29 is the stator 30 of the motor 7. Thus, the stator is rotatably mounted or mounted for rotation with the case. Provided for operating in the stator is a rotor 31 including a drive shaft 32. On the evaporator side of the motor the drive shaft 32 is journaled in a bearing 33 suitably secured in the corresponding end of the frame 24. On the opposite or condenser side of the motor the drive shaft 32 is journaled in an inner bearing 34 which in turn is journaled in an outer bearing 35 suitably secured in the corresponding end of the frame 24. This arrangement provides for relative rotational movement between the compressor and the motor frame and, in a manner which will be brought out more clearly hereinafter, is instrumental in affording rotation of the case by motor reaction during energization of the motor 7 for operating the compressor 6.

Provided on the drive shaft 32 outwardly of the bearing 34 is a crankshaft generally designated 36. The crankshaft 36 includes an eccentrically disposed portion or crank throw and an end portion concentric with the drive shaft and journaled in another bearing 38.

The bearings 34 and 38 are suitably secured in the corresponding legs 39 of a yoke 40. The web or center of the yoke 40 includes an aperture (not shown) about which is secured, as by welding, the bottom edge of a pendulous cylinder 41 of the compressor 6. Provided for operating in the cylinder 41 is a piston 42. Connecting the piston and the crankthrow 37 and adapted for reciprocating the piston in the cylinder during rotation of the crankshaft by the motor 7 is a connecting rod 43.

Suitably secured to the cylinder 41 for closing the top thereof to provide a compression chamber is a cylinder head 43a. Connected to the cylinder head 43a is a refrigerant intake 44. In cooperation with valving means (not shown) in the cylinder head 43a the intake admits refrigerant from the case 5 into the compression chamber of the cylinder on the intake stroke of the piston 42. On the exhaust stroke of the piston, other valving means in the cylinder head (also not shown) open and compressed refrigerant is ejected from the compression chamber into an exhaust tube 45. The exhaust tube conducts the compressed refrigerant into a housing 46 suitably secured to the outer side of the bearing 38.

Also connected to the housing 46 is the inlet portion 23 of the condenser tubing 20. The portion 23 of the condenser tubing is disposed in the case and is formed as a spiral to accommodate relative movements between the tubing and the compressor thereby to relieve strain on the connection of the tubing to the case. The extremity of the inlet 23 extends into the end of the housing 46 and a shoulder 47 formed on the end of the inlet and a resilient gland 48 disposed between the shoulder and the housing provide a leakproof relatively rotatable connection between the condenser and the housing, the high pressure in the housing enhancing the seal afforded by the gland.

In the arrangement described to this point, energization of the motor 7 and resultant rotation of the rotor 31 and the drive shaft 32 effects operation of the piston in the cylinder for taking into the compression chamber in the cylinder refrigerant at low pressure from the case, compressing it and ejecting it at high pressure into the condenser tubing 20 through the exhaust tube 45, the housing 46 and the spiraled inlet 23 of the condenser. In the condenser the compressed refrigerant liquefies and is conducted by the capillary tube 18 through the case 5 and the helical portion 19 of the capillary tube in the cylinder 12 into the evaporator tubing 15. In the evaporator the refrigerant absorbs heat from the surrounding air and enters the cylinder 12 as vapor. In passing through the cylinder 12 into the case 5 for being compressed and repeating the refrigerating cycle, the vapor is in heat exchange relationship with the liquid refrigerant flowing through the spiral portion 19 of the capillary tube 18.

Now it will be seen that the bearings 34 and 38 and the housing 46 provide for relative rotational movement between the compressor 6 and the case 5 and the various elements secured to the case. During operation of the piston in the cylinder through energization of the motor, this arrangement and the low friction nature of the bearings 9 and 13 result in relative movement between the compressor 6 and the case 5, the case being rotated in the stationary frame 11 by reaction to the rotation of the drive shaft 32 by the motor 7 and operation of the piston 42 in the cylinder 41. The rotational speed of the case and the heat exchange elements thereon amounts to the difference between the motor speed and the compressor speed. As indicated above, the cylinder 41 is pendulous which facilitates the reactive rotation of the case.

The case 5 in rotating is effective for rotating the evaporator 3 and the condenser 4, thus the evaporator and the condenser are both moved relative to the surrounding air and the heat exchange relationship therebetween is increased. Additionally, in the present system the heat exchange relationship is varied in accordance with the refrigerant load placed on the system. As the temperature of the air surrounding the evaporator increases the load placed on the compressor and motor increases. This in turn increases the motor reaction which causes the case and, therefore, the evaporator and condenser to rotate at a greater speed to effect the absorption from the surrounding air of a greater amount of heat by the refrigerant therein and the condenser to dissipate to the surrounding air a greater amount of heat from the compressed refrigerant flowing therethrough. Conversely, as the temperature of air surrounding the evaporator decreases the load placed on the compressor and motor decreases and the motor reaction is lessened whereby the movement of the case and the evaporator and condenser thereon is decreased. Thus when greater cooling is required the movement of the heat exchange surfaces relative to the surrounding air is automatically increased and when sufficient cooling of the surrounding air is maintained the relative movement is automatically and accordingly decreased.

Due to the rotation of the case 5 during operation of the system it is essential that current for the motor 7 be supplied thereto through a slip ring and brush arrangement, for example the arrangement generally designated 49. In the arrangement 49, three slip rings 50 are secured in spaced apart relationship in the outer periphery of an insulative sleeve 51 suitably secured on the cylinder 12. Provided for cooperating with the slip rings are three brushes 52. The brushes 52 are carried in a member 53 secured to the portion 14 of the frame 11. Also carried by the member 53 are coil springs 54 whereby the brushes 51 are biased into engagement with the slip rings 50. Leads 55, only one of which is shown, connect the slip rings 50 with the outer extremities of corresponding prongs 56 extending through and sealed in an insulative plug 57 which in turn is sealed in an aperture in the case 5. Connecting the interior extremities of the prongs 56 and the windings of the stator 24 are interior leads, such as the lead 56a. This arrangement provides for the supply of current to the motor from an exterior source electrically connected to the brushes during rotation of the case 5.

Rotation of the case 5 also results in a centrifugal distribution of oil on the interior walls of the case rather than in a gravity maintained sump. Accordingly, means is required to collect enough oil from the walls for lubricating the various bearings and cooling the motor 7. To satisfy this requirement I have formed the case 5 to include an enlarged head portion 58 which, in addition to accommodating the compressor 6, provides an annular trough 59 in which the oil in response to centrifugal force concentrates or collects during operation of the system. The cylinder 41, since it is pendulous, maintains its vertical position as shown in the drawing during operation of the system. Provided for extending substantially vertically toward the inner wall of the case and having one end extending into the trough 59 is an oil pick up member or tube 60. The other end of the pick up tube 60 connects with a cross tube 61, the ends of which are connected to passages 62 extending through the legs 39 of the yoke 40 and the bearings 34 and 38. During rotation of the case the tube 60 picks up oil from the trough 59 and gravity feeds it through the cross tube 61 and the passages 62 to the compressor bearings 34 and 38. Additionally, a nozzle 63 is provided on the pick up tube 60 and is directed toward the windings of the stator 30. The nozzle 63 directs some of the oil picked up by the tube against the stator windings for cooling same. It will be seen that the member 60 need not be a tube. It can be a chute-like element for picking up oil from the inner wall of the liner and directing it to the compressor bearings and motor or even to pumping means incorporated in the compressor for delivering oil to various elements of the unit at particular pressures.

Figure 2:
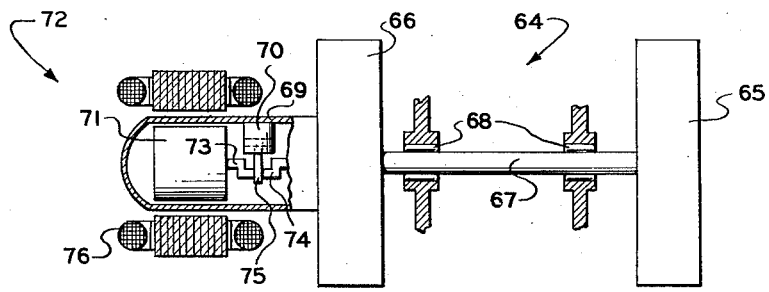
Fig. 2 is a schematic showing of a modified form of my invention.

In Fig. 2 I have shown schematically a modified form of my invention generally designated 64. The system 64 includes a first heat exchange element or evaporator 65 and a second heat exchange element or condenser 66 suitably secured to the opposite ends of a hollow shaft 67. The shaft 67 is suitably journaled between a pair of spaced apart bearings indicated by 68. The shaft 67 serves as a suction line for exhausting vaporous refrigerant from the evaporator, and a capillary tube (not shown) for supplying liquid refrigerant to the evaporator extends through the shaft so as to be in heat exchange relationship with vaporous refrigerant flowing therethrough.

Included in the system 64 on the condenser side thereof is a case 69. The case 69 houses a compressor 70, the cylinder of which is connected or secured to the case, and the rotor 71 of a drive motor generally designated 72. The rotor 71 is rotatably mounted within the case by suitable bearing means (not shown) and includes a drive shaft 73 provided with a crank throw 74. Fitted on the crank throw 74 is one end of a connecting rod 75 adapted for operating the piston (not shown) of the compressor 70.

Stationarily mounted on the exterior of the case and adapted for cooperating with the rotor 71 for effecting rotation thereof is the stator 76 of the motor 72. In this arrangement the stator drives the rotor through the case 69. Rotation of the rotor effects rotation of the drive shaft 73 for operating the piston of the compressor 70 in the cylinder thereof. In reaction to this operation of the piston in the cylinder of the compressor the compressor is rotated in the same direction as the rotation of the rotor and drive shaft. This, since the compressor 70 is connected to the case 69, effects similar rotation of the heat exchange elements, i. e. the evaporator and the condenser 65 and 66, respectively, which are also connected to the case.

In other words, the motor 72 exerts a torque on the rotor 71 which then through reaction results in the compressor, the condenser, and the evaporator all being rotated in the same direction. The rotational speed of the condenser and the evaporator amounts to the difference between the motor speed and the compressor speed. However, the motor shaft rotates at a high speed while the compressor cylinder and thus the condenser and the evaporator rotate at a lower speed. This latter speed depends upon the compressor load for the greater the load the greater is the reaction between the piston and the cylinder and thus the greater is the evaporator and condenser speed. Or more generally stated, as in Fig. 1 the speed of the heat exchanges will vary in accordance with the load placed on the compressor.

The above described modified form of my invention is, of course, basically similar to the preferred embodiment shown in Fig. 1. In fact, the only appreciable difference in the two forms is in the mounting of the motor stator and the compressor cylinder. Other than these different mountings, the remaining components of the two forms may be identical.

Figure 3:
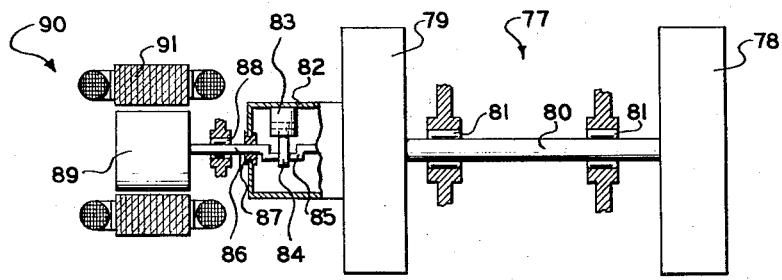
Fig. 3 is a schematic showing of another modified form of my invention.

In Fig. 3 I have schematically shown another modified form of my invention generaly designated 77. The refrigerating system 77 includes a first heat exchange element or evaporator 78 and a second heat exchange element or condenser 79 suitably secured on the opposite ends of a hollow shaft 80. The shaft 80 is journaled in a pair of spaced apart bearings 81 and serves as a suction line for exhausting vaporous refrigerant from the evaporator. Additionally, a capillary tube (not shown) for supplying liquid refrigerant to the evaporator extends through the hollow shaft 80 so as to be in heat exchange relationship with vaporous refrigerant passing therethrough.

Included in the system 77 on the condenser side thereof is a case 82. Included in the case 82 and suitably mounted thereon is the cylinder of a compressor 83. The compressor 83 further includes a connecting rod 84 for reciprocating a piston (not shown) in the cylinder. Provided for reciprocating the connecting rod 84 is a crank throw 85 formed on a drive shaft 86. The drive shaft 86 extends into the case 82 through a gas-tight packing or gland 87. Additionally, the drive shaft 86 is suitably journaled exteriorly of the case in a bearing indicated by 88. Outwardly of the bearing 88 the drive shaft 86 is fitted in the rotor 89 of a drive motor generally designated 90. The drive motor 90 includes a stationarily mounted stator 91 which when energized effects rotation of the rotor 89 for rotating the drive shaft 86. Through the crank throw 85 rotation of the drive shaft 86 effects reciprocation of the connecting rod 84 for operating the piston of the compressor 83 in the cylinder thereof. In reaction to the driving of the compressor in this manner, the compressor, the case to which the compressor is connected, and the evaporator and condenser 78 and 79 which are connected to the case, are rotated in the same direction as the drive shaft. In this modification also, the rotational speed of the heat exchange amounts to the difference between the speeds of the motor and the compressor. And since here again the reaction between the two elements of the compressor will change in accordance with the load placed on the compressor, the speed of the heat exchange elements will change in accordance with the compressor load increasing as the load increases. Moreover as before the shaft rotates at a high speed while the heat exchange elements rotate at a lower speed.

The modification of Fig. 3, like the modification of Fig. 2, can be identical in all other respects with the preferred embodiment shown in Fig. 1 except for the specific difference pointed out above.

It will be seen that my system is applicable for cooling any size compartment, that is, it can be employed for cooling a relatively small compartment such as a food storage compartment in a refrigerator or a larger compartment such as a room.

While I have shown and described specific embodiments of my invention, I do not desire my invention to be limited to the particular forms shown and described, and I intend by the appended claims to cover all modifications within the spirit and scope of my invention.

What I claim as new and desire to secure by Letters Patent of the United States is:

1. In a refrigerating system, a rotatably mounted casing, a compressor including a pumping member and a cylinder element enclosed within said casing, a heat exchanger secured to said casing for rotary movement therewith, a motor connected to said pumping member for driving said pumping member, said motor including a stator element, and means connecting one of said elements to said casing to cause the reaction to the driving of said pumping member to rotate said casing and said heat exchanger.

2. In a refrigerating system, a motor, said motor including a rotor and a stator, a refrigerant compressor adapted for being driven by said rotor, and means mounting said stator for rotational movement and effective to cause rotation of said stator relative to said compressor and in accordance with the refrigerant load on said compressor by motor reaction to the driving of said compressor.

3. In a refrigerating system, a motor, said motor including a rotatably mounted stator, and a compressor driven by said motor, said stator being rotatable relative to said compressor and in accordance with the refrigerant load on said compressor by motor reaction to the driving of said compressor, a heat exchange element, means connecting said heat exchange element to said stator for rotation with said stator for varying the operating capacity thereof.

4. In a refrigerating system, a refrigerating unit comprising a rotatable case, said case housing a refrigerant compressor and a motor for driving said compresser, said compressor being rotatable relative to said case, said motor including a stator connected to said case and a rotor connected to said compressor, said stator and case being adapted for being rotated relative to said compressor in accordance with the refrigerant load on said compressor by motor reaction to the driving of said compressor.

5. In a refrigerating system, a refrigerating unit comprising a rotatable case, said case housing a compressor and a motor for driving said compressor, said compressor being rotatable relative to said case, said motor including a stator connected to said case, said stator and case being adapted for being rotated relative to said compressor and in accordance with the refrigerant load on said compressor by motor reaction to the driving of said compressor, and a heat exchange element carried by said case whereby the operating capacity of said heat exchange element is varied in accordance with the rotation of said case.

6. In a refrigerating system, a refrigerating unit comprising a rotatable case, said case housing a compressor and a motor for driving said compressor, said compressor being rotatable relative to said case, said motor including a stator connected to said case, said stator and case being adapted for being rotated relative to said compressor and in accordance with the refrigerant load placed on said compressor by motor reaction to the driving of said compressor, and a condenser carried by said case, said condenser being adapted for receiving compressed vaporous refrigerant from said compressor, said condenser being further adapted for rotating with said case and dissipating heat from refrigerant in said condenser to liquefy said refrigerant in accordance with said rotation of said case.

7. In a refrigerating system, a refrigeration unit comprising a rotatable case, said case housing a compressor and a motor for driving said compressor, said compressor being rotatable relative to said case, said motor including a stator connected to said case, said stator and case being adapted for being rotated relative to said compressor and in accordance with the refrigerant load placed on said compressor by motor reaction to the driving of said compressor, condensing means for liquefying refrigerant compressed by said compressor, and an evaporator carried by said case, said evaporator being adapted for receiving liquid refrigerant from said condensing means, said evaporator being further adapted for rotating with said case and absorbing heat from the surrounding air and evaporating refrigerant in said evaporator in accordance with said rotation of said case.

8. In a refrigerating system, a refrigerating unit comprising a rotatable case, said case housing a compressor and a motor for driving said compressor, said compressor being rotatable relative to said case, said motor including a stator connected to said case, said stator and case being adapted for being rotated relative to said compressor and in accordance with the refrigerant load placed on said compressor by motor reaction to the driving of said compressor, a condenser carried by said case, said condenser being adapted for receiving compressed vaporous refrigerant from said compressor, said condenser being further adapted for rotating with said case and dissipating heat from refrigerant in said condenser to liquefy said refrigerant in accordance with said rotation of said case, and an evaporator carried by said case, said evaporator being adapted for receiving liquid refrigerant from said condenser, said evaporator being further adapted for rotating with said case and absorbing heat from the surrounding air and evaporating refrigerant in said evaporator in accordance with said rotation of said case.

9. In a refrigerating system, a refrigerating unit comprising a rotatable case, said case housing a compressor and a motor for driving said compressor, said compressor being rotatable relative to said case, said motor including a stator connected to said case, said stator and case being adapted for being rotated relative to said compressor and in accordance with the refrigerant load placed on said compressor by motor reaction to the driving of said compressor, a condenser carried by said case, said condenser being adapted for receiving compressed vaporous refrigerant from said compressor, said condenser being further adapted for rotating with said case and dissipating heat from refrigerant in said condenser to liquefy refrigerant in accordance with said rotation of said case, an evaporator carried by said case, a capillary tube conducting liquid refrigerant to said evaporator from said condenser, said evaporator being adapted for rotating with said case and absorbing heat from the surrounding air and evaporating refrigerant in said evaporator in accordance with said rotation of said case, and means for conducting vaporous refrigerant from said evaporator to said case in heat exchange relationship with said capillary tube.

10. In a refrigerating system, a refrigerating unit comprising a rotatable case, said case housing a compressor and a motor for driving said compressor, said compressor being rotatable relative to said case, said motor including a stator connected to said case, said stator and case being adapted for being rotated relative to said compressor and in accordance with the refrigerant load placed on said compressor by motor reaction to the driving of said compressor, condensing means for liquefying refrigerant compressed by said compressor, an extension formed on said case, said extension having a high resistance to heat flow, an evaporator carried on said extension for being thereby substantially insulated from said case, and means for conducting liquid refrigerant from said condensing means to said evaporator, said evaporator being adapted for rotating with said case and absorbing heat from the surrounding air and evaporating refrigerant in said evaporator in accordance with said rotation of said case.

11. In a refrigerating system, a refrigerating unit comprising a rotatable case, said case housing a compressor and a motor for driving said compressor, said compressor being rotatable relative to said case, said motor including a stator connected to said case, said stator and case being adapted for being rotated relative to said compressor and in accordance with the refrigerant load placed on said compressor by motor reaction to the driving of said compressor, condensing means for liquefying refrigerant compressed by said compressor, a hollow extension formed on said case, said extension having a high resistance to heat flow, an evaporator carried on said extension for being thereby substantially insulated from said case, and a capillary tube extending through said case and said extension for conducting liquid refrigerant from said condensing means to said evaporator, said evaporator being adapted for rotating with said case and absorbing heat from the surrounding air and evaporating refrigerant in said evaporator in accordance with said rotation of said case, said extension receiving vaporous refrigerant from said evaporator for conduction to said case, said capillary tube including a helically wound portion disposed in said extension for providing high heat transfer between liquid in said helically wound portion and vaporous refrigerant returning to said case through said extension.

12. In a refrigerating system, a refrigerating unit comprising a rotatable case, said case housing compressor and a motor for driving said compressor, said compressor being rotatable relative to said case, said motor including a stator connected to said case, said stator and case being adapted for being rotated relative to said compressor, by motor reaction to the driving of said compressor, and means extending from said compressor toward the inner wall of said case, said means being adapted for picking up oil centrifugally distributed on said inner wall of said case and conducting said oil to said compressor and motor.

13. In a refrigerating system, a refrigerating unit comprising a rotatable case, said case housing a pendulous compressor and a motor for driving said compressor, said compressor being rotatable relative to said case, said motor including a stator connected to said case, said stator and case being adapted for being rotated relative to said compressor by motor reaction to the driving of said compressor, and a member extending substantially vertically from said compressor toward the inner wall of said case, said member being adapted for picking up oil centrifugally distributed on said inner wall of said case and gravity feeding said oil to said compressor and motor.

14. In a refrigerating system, a refrigerating unit comprising a rotatable case, said case housing a pendulous compressor and a motor for driving said compressor, said compressor being rotatable relative to said case, said motor including a stator connected to said case, said stator and case being adapted for being rotated relative to said compressor by motor reaction to the driving of said compressor, said case being formed to include an annular trough extending transverse to the axis of rotation of said case, said trough being adapted for having oil in said case centrifugally collected therein, and a tube extending substantially vertically from said compressor into said trough, said tube being adapted for picking up oil in said trough and gravity feeding said oil to said compressor and motor.

15. In a refrigerating system, a rotatable case, said case housing a motor rotor and a compressor adapted for being driven through rotation of said rotor, a stationary motor stator mounted exteriorly of said case for rotating said rotor through said case, said compressor being connected to said case, said compressor and said case being rotated by reaction to the driving of said compressor in accordance with the refrigerant load on said compressor, and a heat exchange element connected to said case, said heat exchange element being adapted for rotating with said case for varying the operating capacity thereof.

16. In a refrigerating system, a rotatable case, said case housing a compressor, said compressor having a pumping element and a cylinder element, a motor located exteriorly of said case, said motor including a drive shaft extending into said case and connected to said pumping element for driving said pumping element, said cylinder element being connected to said case, said cylinder element and said case being rotated by reaction to the driving of said pumping element in accordance with the refrigerant load on said compressor, and a heat exchange element connected to said case, said heat exchange element being adapted for rotating with said case for varying the operating capacity thereof.

References Cited in the file of this patent

UNITED STATES PATENTS

| | | |
|---|---|---|
| 1,145,226 | Bertsch | July 6, 1915 |
| 1,204,061 | Plekenpal | Nov. 7, 1916 |
| 1,889,817 | Audiffren | Dec. 6, 1932 |
| 2,156,628 | Hintze | May 2, 1939 |

FOREIGN PATENTS

| | | |
|---|---|---|
| 305,413 | Germany | May 6, 1918 |